(12) United States Patent
Zhang et al.

(10) Patent No.: US 12,413,701 B2
(45) Date of Patent: Sep. 9, 2025

(54) FOLDABLE ELECTRONIC DEVICE FOR MULTI-VIEW IMAGE CAPTURE

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 18/044,026

(22) PCT Filed: Nov. 25, 2020

(86) PCT No.: PCT/CN2020/131425
§ 371 (c)(1),
(2) Date: Mar. 3, 2023

(87) PCT Pub. No.: WO2022/109855
PCT Pub. Date: Jun. 2, 2022

(65) Prior Publication Data
US 2024/0022702 A1 Jan. 18, 2024

(51) Int. Cl.
*G06T 17/20* (2006.01)
*G06T 5/70* (2024.01)
(Continued)

(52) U.S. Cl.
CPC .............. *H04N 13/351* (2018.05); *G06T 5/70* (2024.01); *G06T 7/10* (2017.01); *G06T 7/593* (2017.01);
(Continued)

(58) Field of Classification Search
CPC .......... H04N 13/351; H04N 2013/0081; G06T 7/10; G06T 7/593; G06T 5/70; G06T 15/00; G06V 40/161; H04M 1/0214
See application file for complete search history.

(56) References Cited

U.S. PATENT DOCUMENTS

2010/0295926 A1* 11/2010 Estrada ................... G06T 7/586
348/47
2012/0327197 A1* 12/2012 Yamashita .............. G06T 7/593
348/E13.074
(Continued)

FOREIGN PATENT DOCUMENTS

CN 109565567 A 4/2019
CN 111164647 A 5/2020
(Continued)

OTHER PUBLICATIONS

International Search Report and Written Opinion—PCT/CN2020/131425—ISA/CN—Jun. 10, 2021.
(Continued)

*Primary Examiner* — Phuc N Doan
(74) *Attorney, Agent, or Firm* — QUALCOMM Incorporated

(57) ABSTRACT

Methods, systems, and apparatuses are provided to automatically adjust the position of image sensors, and generate a multi-view image based on image data captured from the image sensors. For example, an image capture device includes a housing comprising a first housing portion and a second housing portion, with a first sensor coupled to the first housing portion, and a second sensor coupled to the second housing portion. A coupling device, such as a hinge, couples the first housing portion to the second housing portion. The image capture device obtains image data from the first sensor and the second sensor, and determines an object depth based on the obtained image data. The image capture device outputs an adjusted angle based on the object depth, and obtains additional image data from the first and second sensors. The image capture device generates the multi-view image based on the additional image data.

29 Claims, 10 Drawing Sheets

(51) Int. Cl.

| | | |
|---|---|---|
| *G06T 7/10* | (2017.01) | |
| *G06T 7/593* | (2017.01) | |
| *G06T 15/00* | (2011.01) | |
| *G06V 40/16* | (2022.01) | |
| *H04M 1/02* | (2006.01) | |
| *H04N 13/00* | (2018.01) | |
| *H04N 13/351* | (2018.01) | |

(52) U.S. Cl.
CPC ............ *G06T 15/00* (2013.01); *G06V 40/161* (2022.01); *H04M 1/0214* (2013.01); *H04N 2013/0081* (2013.01)

(56) References Cited

U.S. PATENT DOCUMENTS

| | | | |
|---|---|---|---|
| 2013/0271578 A1* | 10/2013 | Richards | G06T 5/80 |
| | | | 348/47 |
| 2016/0246330 A1* | 8/2016 | Kim | G06F 1/1652 |
| 2016/0378137 A1 | 12/2016 | Kwong et al. | |
| 2016/0381345 A1 | 12/2016 | Wu et al. | |
| 2017/0295358 A1* | 10/2017 | Cabral | H04N 17/002 |
| 2018/0213218 A1* | 7/2018 | Yu | G06V 10/10 |
| 2020/0084354 A1 | 3/2020 | Agrawal et al. | |
| 2021/0021768 A1 | 1/2021 | Tong | |
| 2024/0007601 A1* | 1/2024 | Gradolewski | H04N 13/296 |

FOREIGN PATENT DOCUMENTS

| | | |
|---|---|---|
| CN | 111355878 A | 6/2020 |
| CN | 111770273 A | 10/2020 |
| EP | 3902236 A1 | 10/2021 |
| KR | 20110139419 A | 12/2011 |
| WO | 2017086027 A1 | 5/2017 |
| WO | 2020125797 A1 | 6/2020 |

OTHER PUBLICATIONS

Supplementary European Search Report—EP20962746—Search Authority—The Hague—Jul. 16, 2024.
Taiwan Search Report—TW110139873—TIPO—Feb. 8, 2025.

* cited by examiner

FOLDABLE ELECTRONIC DEVICE FOR MULTI-VIEW IMAGE CAPTURE

TECHNICAL FIELD

This disclosure relates generally to imaging devices and, more specifically, to foldable display devices with image capturing capabilities.

BACKGROUND

Image capture devices, such as phones, tablets, and smart devices, may include an external facing camera to capture images. For example, the camera may be located on an outwardly facing surface that is opposite an inwardly facing surface, where the inwardly facing surface includes a display. Images captured from the camera on the outwardly facing surface are provided on the display. The image capture devices may also include a camera on the inwardly facing surface, such as to facilitate the capture of "selfies." Some of these image capture devices include foldable displays. Each side of the foldable display includes an outwardly facing surface and an inwardly facing surface. Image capture devices with foldable displays may include one or more cameras on each of the outwardly facing surfaces.

Additionally, image capture devices use various signal-processing techniques in an attempt to render high quality images. For example, the image capture devices may automatically focus their lens for image sharpness, automatically set the exposure time based on light levels, and automatically adjust the white balance to accommodate for the color temperature of a light source. In some examples, an image capture device may generate a multi-view image based on images captured from multiple cameras. In some examples, image capture devices include facial detection technology. Facial detection technology allows the image capture device to identify faces in a field of view of a camera's lens. The image capture device may then apply the various signal processing techniques based on the identified faces.

SUMMARY OF THE INVENTION

According to one aspect, a method for operating an image capture device includes obtaining first image data from a first sensor coupled to a first portion of a housing of the image capture device. The method also includes obtaining second image data from a second sensor coupled to a second portion of the housing. The method further includes determining a depth of an object based on the first image data and the second image data. The method also includes outputting an adjusted angle between the first housing portion and the second housing portion based on the determined depth. Further, the method includes performing an image capture operation in response to the adjustment.

According to another aspect, an image capture device comprises a housing comprising a first housing portion and a second housing portion. The image capture device also comprises a non-transitory, machine-readable storage medium storing instructions, and at least one processor coupled to the non-transitory, machine-readable storage medium. The at least one processor is configured to execute the instructions to obtain first image data from a first sensor coupled to the first housing portion of the housing. The processor is also configured to execute the instructions to obtain second image data from a second sensor coupled to the second housing portion of the housing. Further, the processor is configured to execute the instructions to determine a depth of an object based on the first image data and the second image data. The processor is also configured to execute the instructions to output an adjusted angle between the first housing portion and the second housing portion based on the depth. The processor is further configured to execute the instructions to perform an image capture operation based on the adjusted angle.

According to another aspect, a non-transitory, machine-readable storage medium stores instructions that, when executed by at least one processor, causes the at least one processor to perform operations comprising: obtaining first image data from a first sensor coupled to a first housing portion of a housing of an image capture device; obtaining second image data from a second sensor coupled to a second housing portion of the housing; determining a depth of an object based on the first image data and the second image data; outputting an adjusted angle between the first portion and the second portion based on the depth; and performing an image capture operation based on the adjusted angle.

According to another aspect, an image capture device comprises: a means for obtaining first image data from a first sensor coupled to a first housing portion of a housing of an image capture device; a means for obtaining second image data from a second sensor coupled to a second housing portion of the housing; a means for determining a depth of an object based on the first image data and the second image data; a means for outputting an adjusted angle between the first portion and the second portion based on the depth; and a means for performing an image capture operation based on the adjusted angle.

DETAILED DESCRIPTION OF THE EMBODIMENTS

Figure 1:
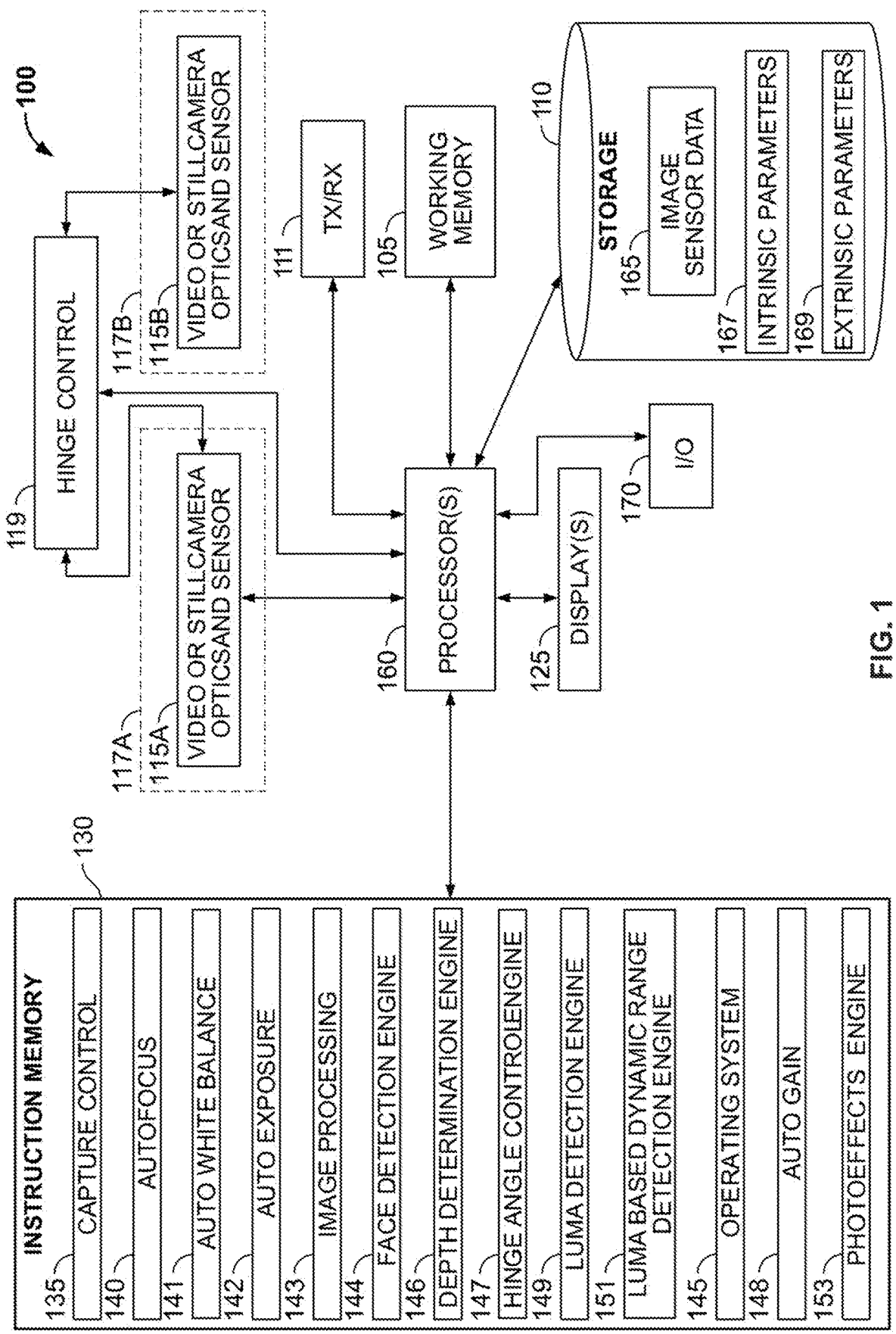
FIG. 1 is a block diagram of an exemplary image capture device, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

In some implementations, an image capture device may be foldable and may include a foldable display along an inner surface. For example, the image capture device may be foldable along a center portion that includes one or more coupling devices (e.g., hinges), and the center portion may separate a first portion (e.g., left side) of the image capture device from a second portion (e.g., right side) of the image capture device. Each of the first portion and the second portion may include an inner surface and an outer surface (e.g., a first inner surface and second inner surface). For example, when shutting (e.g., closing) the image capture device, each of the inner surfaces may face each other as the first portion and the second portion of the image capture device are brought towards each other. When shut, the outer surfaces of the first portion and the second portion face outwards, and the inner surfaces of the first portion and the second portion may establish boundaries of, or bound, a cavity or void space (e.g., they may form a cavity). The foldable display may also include a corresponding portion along each inner surface of the first and second portions of the image capture device. The inner surfaces (and foldable display) may be presented on a "user facing" side of the image capture device.

The image capture device may include one or more cameras on the inner surface of the first portion, and one or more cameras on the inner surface of the second portion. In some examples, the image capture device may include one or more cameras on the outer surface of the first portion. In some examples, the image capture device may include one or more cameras on the outer surface of the second portion.

The image capture device may capture image data from each of the cameras. For example, the image capture device may capture first image data from a first camera positioned on the inner surface of the first portion (i.e., the first inner surface), and may also capture second image data from a second camera positioned on the inner surface of the second portion (i.e., the second inner surface). The first camera and second camera may collectively establish be a stereo camera (e.g., left and right cameras).

The image capture device may determine a depth of an object based on the first image data and the second image data. For example, the image capture device may identify the object in each field of view (FOV) of the first and second cameras, and may select a lens position that provides a focus value for a region of interest (ROI) that includes the object. Based on the determined depth, the image capture device may adjust automatically the one or more coupling devices to change an angle that separates the first and second portions (i.e., the angle of the one or more coupling devices) In response to the adjustment, the angle may increase (e.g., when opening the image capture device), or the angle may decrease (e.g., when closing the image capture device).

In some examples, the image capture device provides a visual or audible indication to a user of image capture device to adjust the angle (e.g., by further closing, or further opening, the image capture device).

In some examples, the image capture device determines the current angle, and adjusts the angle based on the depth value and the current angle.

In some examples, the image capture device determines the depth of objects based on camera parameters. The camera parameters may include, for each camera, intrinsic and extrinsic parameters. The intrinsic parameters and extrinsic parameters may be predetermined and stored in a data repository maintained by the image capture device (e.g., within a tangible, non-transitory memory).

Intrinsic parameters may characterize a transformation from image plane coordinates to pixel coordinates for each of the first and second cameras. For example, intrinsic parameters may include, for each of the first and second cameras, a focal length, an image sensor format, and a principal point. Extrinsic parameters that characterize a relative position and orientation of each of the first or second cameras. For example, extrinsic parameters may include a rotation matrix and a translation matrix that characterize the relative position and orientation, respectively, of one, or more of the first and second cameras. For example, the translation matrix may identify a translation of a frame of reference from one camera to a frame of reference to another camera. For example, a first translation matrix may identify a translation of a frame of reference from the first camera to the second camera, and a second translation matrix may identify a translation of a frame of reference from the second camera to the first camera. The rotation matrix may identify a rotation of a frame of reference from one camera to a frame of reference to another camera. For example, a first rotation matrix may identify a rotation of a frame of reference from the first camera to the second camera, and a second rotation matrix may identify a rotation of a frame of reference from the second camera to the first camera.

Further, the extrinsic parameters may include a baseline length for the first and second cameras. The baseline length may define a distance between the optic centers of the first and second cameras. In some examples, the larger the angle between the first and second inner surfaces, the larger the baseline length between the first and second cameras. By way of example, a first angle between the first and second inner surfaces of the image capture device may establish a first baseline length between the first and second cameras, and a second angle between the first and second inner surfaces of the image capture device may establish a second baseline length between the first and second cameras. If, for instance, the first angle were to exceed the second angle, the established first baseline length may also exceed, and be larger than, the corresponding second baseline length.

The image capture device may align the first image data from the first camera with the second image data from the second camera based on the rotation matrices, translation matrices, and additionally, or alternatively, the baseline length. For example, for a given angle between the first and second inner surfaces, the extrinsic parameters may specify a rotation matrix and a translation matrix for each of the first and second camera, as well as a corresponding baseline length. The image capture device may determine the current angle, and may align the first image data from the first camera with the second image data from the second camera based on the rotation matrices, translation matrices, and additionally, or alternatively, the baseline length corresponding to the current angle. In some examples, image capture device may determine the extrinsic parameters during calibration of each of the first and second cameras prior to use.

The image capture device may also identify features (e.g., objects) in each of the first image data and the second image data. According to some examples, pixels having features (e.g., edges, brightness, color) in the first image data are matched with pixels having corresponding features in the second image data. Based on the matched pixels in the first and second image data, the image capture device may generate a disparity map (e.g., stereoscopic depth map) using any technique known in the art. The disparity map may encode a difference in horizontal coordinates of the corresponding features, for example, and may include disparity values where each disparity value is inversely proportional to a scene depth at a corresponding pixel location.

The image capture device may compute depth values based on the intrinsic parameters of each of the first camera and the second camera. For example, the image capture device may determine the depth values based on the focal length, image sensor format, and principal point of each of the first camera and the second camera. In some examples, the image capture device may compute the depth values based on the rotation matrices for the first and second cameras. In some examples, the image capture device computes the depth values based on features classified within first image data obtained from the first camera and within second image data obtained from the second camera, and based on portions of the disparity map. The image capture device may also compute the depth values based on, among other things, a focal length of the first camera, a focal length of the second camera, a combination of the focal lengths of the first and second cameras, the corresponding baseline length, and portions of the disparity map.

In some examples, the computing device includes a housing with a first portion and a second portion, where the first portion forms an angle relative to the second portion. Further, the first portion of the housing may include a first sensor, and the second portion of the housing may include a second sensor. The computing device may determine a first angle between the first portion and the second portion of the housing, and further determine a baseline length between the first sensor and the second sensor based on the first angle. Further, the computing device may determine a focal length of at least one of the first sensor and the second sensor. The computing device may generate the depth values based on the baseline length, the focal length, and portions of the disparity map.

Further, the image capture device may adjust the angle between the first and second inner surface based on the computed depth values. For example, the image capture device may identify an object based on the classified features, and compute depth values for the object as described above. The image capture device may compute an object depth for the object based on the depth values. Further, the image capture device may determine a desired baseline length between the first and second cameras for capturing an image of the identified object based on the object depth. For example, the image capture device may compute a larger baseline length for an object with a larger object depth, and a smaller baseline length for an object with a smaller object depth. In some examples, the image capture device maintains within a memory device one or more tables that identify a matching of desired baseline lengths to object depths for a particular object. For example, a first table may identify a desired baseline length for each of a plurality of object depths for an object classified as a "face," and a second table may identify a desired baseline length for each of a plurality of object depths for an object classified as a "tree."

Based on the desired baseline length, the image capture device may determine the adjustment to the angle between the first and second inner surfaces. For example, the image capture device may determine a current baseline length between the first and second cameras, and may compare the current baseline length to the desired baseline length to determine an angle adjustment amount. The image capture device may adjust the angle based on the determined angle adjustment amount.

In some examples, after the angle is adjusted, the image capture device captures third image data from the first camera and fourth image data from the second camera, and generates a multi-view image based on the third image data and the fourth image data. For example, the image capture device may identify features in the third image data and fourth image data, and generate a second disparity map based on the identified features. The image capture device may generate the multi-view image based on the third image data, fourth image data, and portions of the second disparity map using any known technique. The multi-view image may, for example, include a three-dimensional (3D) image. In addition examples, the multi-view image may include a "high dynamic range" image, or a "non-high dynamic range" image.

In some examples, the image capture device may periodically determines whether the angle is to be adjusted while a user is capturing an image of a scene. For example, the image capture device may periodically obtain image data from each of the first and second cameras, and adjust the angle as described herein, until a predetermined amount of time before image data is captured to generate the multi-view image.

In some implementations, the image capture device may determine a ROI after adjusting the angle for improved automatic focus (AF), automatic exposure (AE), automatic gain (AG), or automatic white balance (AWB) control. For example, the image capture device may adjust the angle as described herein, identify a feature that is a subject (e.g., within third image data and further image data), and determine the ROI that includes a face of the subject. The image capture device may then determine (e.g., adjust, apply) one or more of AF, AE, AG, or AWB control based on image data within the ROI.

In some examples, the image capture device may provide automated image capture enhancements (e.g., 3D image enhancements) to a multi-view image generated in response to adjusting the angle. For example, the image capture device may apply photoeffects to the multi-view image to generate a user-composed image. A user may select the photoeffects for the image capture, for example. Examples of photoeffects include color shifts, segmentation effects (e.g., depth of field effects, Bokeh effects, blue screening, object filters, such as face filters, etc., augmented reality (AR), virtual reality (VR), and averaging effects. An averaging effect may, for example, average the color channel values of all, or a selected group of, pixels in two different images. A depth of field effect (e.g., Bokeh effect) may rely on color channel values of pixels in the third image data and pixels in the fourth image data.

FIG. 1 is a block diagram of an exemplary image capture device 100. The functions of image capture device 100 may be implemented in one or more processors, one or more field-programmable gate arrays (FPGAs), one or more application-specific integrated circuits (ASICs), one or more state machines, digital circuitry, any other suitable circuitry, or any suitable hardware.

In this example, image capture device 100 includes at least one processor 160 that is operatively coupled to (e.g., in communication with) camera optics and sensor 115A, and to camera optics and sensor 115B, for capturing corresponding images. Camera optics and sensors 115A and 115B may each include one or more image sensors and one or more lenses to capture images. Camera optics and sensor 115A may be disposed within a first portion 117A of image capture device 100, and camera optics sensor 115B may be disposed within a second portion 117B of image capture device 100. Each of camera optics and sensors 115A and 115B may be based, for example, on a time-of-flight (TOF) or a structured light (e.g., infrared, random dot projection) image capture system. Processor 160 is also operatively coupled to hinge control 119, which may allow for control (e.g., a mechanical adjustment) of a hinge angle of a hinge that connects the first portion 117A to the second portion 117B. For example, processor 160 may control hinge control 119 to adjust the hinge angle between 0 degrees and 180 degrees, inclusively.

Processor 160 may also be operatively coupled to instruction memory 130, working memory 105, input device 170, transceiver 111, foldable display 125, and storage medium 110. Input device 170 may be, for example, a keyboard, a touchpad, a stylus, a touchscreen, or any other suitable input device.

Image capture device 100 may be implemented in a computer with image capture capability, a special-purpose camera, a multi-purpose device capable of performing imaging and non-imaging applications, or any other suitable device. For example, image capture device 100 may include a portable personal computing device such as a mobile phone (e.g., smartphone), tablet, personal digital assistant, or any other suitable device.

Processor 160 may also include one or more processors. For example, processor 160 may include one or more central processing units (CPUs), one or more graphics processing units (GPUs), one or more digital signal processors (DSPs), one or more image signal processors (ISPs), one or more device processors, and/or one or more of any other suitable processors. Processor 160 may also perform various image capture operations on received image data to execute AF, AG, AE, and/or AWB. Further, processor 160 may perform various management tasks such as controlling foldable display 125 to display captured images, or writing to or reading data from working memory 105 or storage medium 110. For example, processor 160 may obtain intrinsic parameters 167 and extrinsic parameters 169, for each camera, from storage medium 110. Storage medium 110 may also store image capture parameters for image capture operations, such as AF, AE, and/or AWB parameters. Processor 160 may apply AF, AE, and/or AWB based on the image capture parameters.

Processor 160 may store captured images within storage medium 110. For example, processor 160 may obtain image sensor data 165 from camera optics and sensors 115A, 115B, and may store the obtained image sensor data 165 within storage medium 110.

In some examples, processor 160 may apply photoeffects to captured images. For example, processor 160 may apply color shifts, depth of field (e.g., Bokeh effects), augmented reality (AR), virtual reality (VR), and averaging effects to captured images.

In some instances, transceiver 111 may facilitate communications between image capture device 100 and one or more network-connected computing systems or devices across a communications network using any suitable communications protocol. Examples of these communications protocols include, but are not limited to, cellular communication protocols such as code-division multiple access (CDMA®), Global System for Mobile Communication (GSM®), or Wideband Code Division Multiple Access (WCDMA®) and/or wireless local area network protocols such as IEEE 802.11 (WiFi®) or Worldwide Interoperability for Microwave Access (WiMAX®).

Processor 160 may control each of camera optics and sensor 115A, 115B to capture images. For example, processor 160 may instruct camera optics and sensor 115A to initiate a capture of an image and to capture corresponding image data (e.g., take a picture), and processor 160 may receive the captured image data from camera optics and sensor 115A. Similarly, processor 160 may instruct camera optics and sensor 115B to initiate a capture of an additional image and to capture corresponding image data, and processor 160 may receive the captured image data from camera optics and sensor 115B.

In some examples, camera optics and sensor 115A, storage medium 110, and processor 160 provide a means for capturing first image data from a first front-facing camera disposed within a first inner portion (e.g., first portion 117A) of a foldable display (e.g., foldable display 125). In some camera optics and sensor 115B, storage medium 110, and processor 160 provide a means for capturing second image data from a second front-facing camera disposed within a second inner portion (e.g., second portion 117B) of the foldable display (e.g., foldable display 125).

Instruction memory 130 may store instructions that may be accessed (e.g., read) and executed by processor 160. For example, instruction memory 130 may include read-only memory (ROM) such as electrically erasable programmable read-only memory (EEPROM), flash memory, a removable disk, CD-ROM, any non-volatile memory, or any other suitable memory.

Processor 160 may store data to, and read data from, working memory 105. For example, processor 160 may store a working set of instructions to working memory 105, such as instructions loaded from instruction memory 130. Processor 160 may also use working memory 105 to store dynamic data created during the operation of image capture device 100. Working memory 105 may be a random access memory (RAM) such as a static random access memory (SRAM) or dynamic random access memory (DRAM), or any other suitable memory.

In this example, instruction memory 130 stores capture control instructions 135, automatic focus (AF) instructions 140, automatic white balance (AWB) instructions 141, automatic exposure (AE) instructions 142, automatic gain (AG) instructions 148, image processing instructions 143, face detection engine 144, depth determination engine 146, hinge-angle control engine 147, luma detection engine 149, luma-based dynamic range detection engine 151, photoeffects engine 153, and operating system instructions 145. Instruction memory 130 may also include additional instructions that configure processor 160 to perform various image processing and device management tasks.

AF instructions 140 may include instructions that, when executed by processor 160, cause a lens of camera optics and sensors 115A or 115B to adjust a position of a corresponding lens. For example, processor 160 may cause the lens of camera optics and sensor 115A to adjust so that light from a ROI within a FOV of the imaging sensor is focused in a plane of the sensor. The selected ROI may correspond to one or more focus points of the AF system. AF instructions 140 may include instructions that, upon execution by processor 150, cause processor 160 to perform autofocus operations, such as finding the optimal lens position for bringing light from a ROI into focus in the plane of a sensor. Autofocus may include, for example, phase detection autofocus (PDAF), contrast autofocus, or laser autofocus.

AWB instructions 141 may include instructions that, when executed by processor 160, cause processor 160 to determine a color correction to be applied to an image. For example, the executed AWB instructions 141 may cause processor 160 to determine an average color temperature of the illuminating light source under which camera optics and sensor 115A or camera optics and sensor 115B captured an image, and to scale color components (e.g., R, G, and B) of the captured image so they conform to the light in which the image is to be displayed or printed. Further, in some examples, executed AWB instructions 141 may cause processor 160 to determine the illuminating light source in a ROI of the image. The processor 160 may then apply a color correction to the image based on the determined color temperature of the illuminating light source in the ROI of the image.

AG instructions 148 may include instructions that, when executed by processor 160, cause processor 160 to determine a gain correction to be applied to an image. For example, the executed AG instructions 148 may cause processor 160 to amplify a signal received from a lens of camera optics and sensor 115A or camera optics and sensor 115B. Executed AG instructions 148 may also cause processor 160 to adjust pixel values (e.g., digital gain).

AE instructions 142 may include instructions that, when executed by processor 160, cause processor 160 to determine the length of time that one or more sensing elements, such as an imaging sensor of camera optics and sensor 115A or camera optics and sensor 115B, integrate light before capturing an image. For example, executed AE instructions 142 may cause processor 160 to meter ambient light, and select an exposure time for a lens based on the metering of the ambient light. As the ambient light level increases, the selected exposure time becomes shorter, and as the ambient light level decreases, the selected exposure time becomes longer. In the case of a digital single-lens reflex (DSLR) camera, for example, executed AE instructions 142 may cause processor 160 to determine the exposure speed. In further examples, executed AE instructions 142 may cause processor 160 to meter the ambient light in a ROI of the field of view of a sensor of camera optics and sensor 115A or camera optics and sensor 115B.

Capture control instructions 135 may include instructions that, when executed by processor 160, cause processor 160 to adjust a lens position, set an exposure time, set a sensor gain, and/or configure a white balance filter of the image capture device 100. Capture control instructions 135 may further include instructions that, when executed by processor 160, control the overall image capture functions of image capture device 100. For example, executed capture control instructions 135 may cause processor 160 to execute AF instructions 140, which causes processor 160 to calculate a lens or sensor movement to achieve a desired autofocus position and output a lens control signal to control a lens of camera optics and sensor 115A or camera optics and sensor 115B.

Operating system 145 may include instructions that, when executed by processor 160, cause processor 160 to implement an operating system. The operating system may act as an intermediary between programs, such as user applications, and the processor 160. Operating system instructions 145 may include device drivers to manage hardware resources such as camera optics and sensors 115A or 115B, foldable display 125, or transceiver 111. Further, one or more of executed image processing instructions 143, as discussed herein, may interact with hardware resources indirectly through standard subroutines or application programming interfaces (APIs) that may be included in operating system instructions 145. The executed instructions of operating system 145 may then interact directly with these hardware components.

Face detection engine 144 may include instructions that, when executed by processor 160, cause processor 160 to initiate facial detection on image data representing one or more subjects within a field of view of image capture device 100. For example, processor 160 may execute face detection engine 144 to determine a ROI within a field of view of a lens of camera optics and sensor 115 that includes one or more faces of corresponding subjects. In some instances, face detection engine 144 may, upon execution by processor 160, obtain raw image sensor data of an image in a field of view of a lens of camera optics and sensor 115A or camera optics and sensor 115B. Executed face detection engine 144 may also may initiate face detection, and may determine if one or more faces of subjects are in the field of view by, for example, performing facial detection operations locally within processor 160. The facial detection operations may include, but are not limited to, performing computations to determine if the field of view of image capture device 100 contains one or more faces and, if so, to determine (e.g., and identify) a region in the FOV (e.g., a ROI) containing the one or more faces.

Depth determination engine 146 may include instructions that, when executed by processor 160, cause processor 160 to determine a depth based on image data captured with camera optics and sensor 115A or camera optics and sensor 115B. For example, processor 160 may execute depth determination engine 146 to identify features in first image data captured with camera optics and sensor 115A and second image data captured with camera optics and sensor 115B. Further and based on execution of depth determination engine 146, processor 160 generates a disparity map using any technique known in the art. The disparity map may include depth values that identify a scene depth at each corresponding pixel location, such as a pixel locations corresponding to each identified feature.

Image processing instructions 143 may include instructions that, when executed, cause processor 160 to perform one or more image processing operations involving captured image data, such as, but not limited to, demosaicing, noise reduction, cross-talk reduction, color processing, gamma adjustment, image filtering (e.g., spatial image filtering), lens artifact or defect correction, image sharpening, or other image processing functions. Further, executed image processing instructions 143 may generate a multi-view image, such as a 3D image, based on the first image data captured with camera optics and sensor 115A, the second image data captured with camera optics and sensor 115B, and the generated depth values.

Hinge-angle control engine 147 may include instructions that, when executed by processor 160, cause processor 160 to adjust a hinge angle, such as a hinge angle of a hinge assembly that connects the first portion 117A of image capture device 100 to the second portion 117B of image capture device 100. For example, processor 160 may execute hinge-angle control engine 147 to control hinge control 119, which may include a hinge assembly operably coupled to the first portion 117A and to the second portion 117B. Processor 160 may issue commands to hinge control 119 to open, or close, the hinge assembly, thereby increasing, or decreasing, respectively, the hinge angle, for example.

Luma detection engine 149 may include instructions that, when executed by processor 160, cause processor 160 to determine values, such as luminance values, based on pixel values of pixels of the captured image data and pixel values of pixels within the detected ROI (e.g., the ROI detected by processor 160 executing face detection engine 144). For example, luma detection engine 149, upon execution by processor 160, may determine a first value based on luminance pixel values of all pixels of a captured image, such as image data within a field of view of a lens of camera optics and sensor 115A or camera optics and sensor 115B. Executed luma detection engine 149 may also cause processor 160 to determine a second value based on luminance pixel values of all pixels within the detected ROI that includes a face of a subject. In some examples, one or more of the first value and the second value include average luminance pixel values of the corresponding pixel values. In other examples, one or more of the first value and the second value include median luminance pixel values of the corresponding pixel values. In other examples, the first value and the second value may be determined based on any suitable mathematical or statistical process or technique, such as, but not limited to, determining a total sum of squares.

Luma-based dynamic range detection engine 151 may include instructions that, when executed by processor 160, cause processor 160 to determine whether captured image data (e.g., image sensor data) identifies a "high dynamic range" scene or a "non-high dynamic range" scene based on the values determined by executed luma detection engine 149 (e.g., the first value and the second value). For example, and upon execution by processor 160, executed luma-based dynamic range detection engine 151 may compare the first value to the second value, and determine whether the captured image data identifies a "high dynamic range" scene or a "non-high dynamic range" scene based on the comparison. In some instances, executed luma-based dynamic range detection engine 151 may determine a difference between the first value and the second value, and if the difference were greater than a threshold amount (e.g., a predetermined threshold amount), executed luma based dynamic range detection engine 151 may determine that the captured image data identifies a "high dynamic range" scene. Alternatively, if the difference were equivalent to, or less than, the threshold amount, executed luma-based dynamic range detection engine 151 may determine that the captured image data identifies a "non-high dynamic range" scene. In other instances, executed luma-based dynamic range detection engine 151 may determine whether the captured image data identifies a "high dynamic range" scene or a "non-high dynamic range" scene based on applying any suitable mathematical or statistical process or technique to the first value and the second value.

Photoeffects engine 153 may include instructions that, when executed by processor 160, cause processor 160 to apply one or more photoeffects to image data captured by camera optics and sensor 115A or camera optics and sensor 115B. Examples of photoeffects include color shifts, depth of field (e.g., Bokeh effects), AR, VR, and averaging effects. In some examples, executed photo effects engine 153 applies one or more photoeffects to a multi-view image generated by executed image processing engine 143.

Although in FIG. 1, processor 160 is located within image capture device 100, in some examples, processor 160 may include one or more cloud-distributed processors. For example, one or more of the functions described herein with respect to processor 160 may be carried out (e.g., performed) by one or more remote processors, such as one or more cloud processors within corresponding cloud-based servers. The cloud processors may communicate with processor 160 via a network, where processor 160 connects to the network via transceiver 111. Each of the cloud processors may be coupled to non-transitory cloud storage media, which may be collocated with, or remote from, the corresponding cloud processor. The network may be any personal area network (PAN), local area network (LAN), wide area network (WAN) or the Internet.

Figure 2:
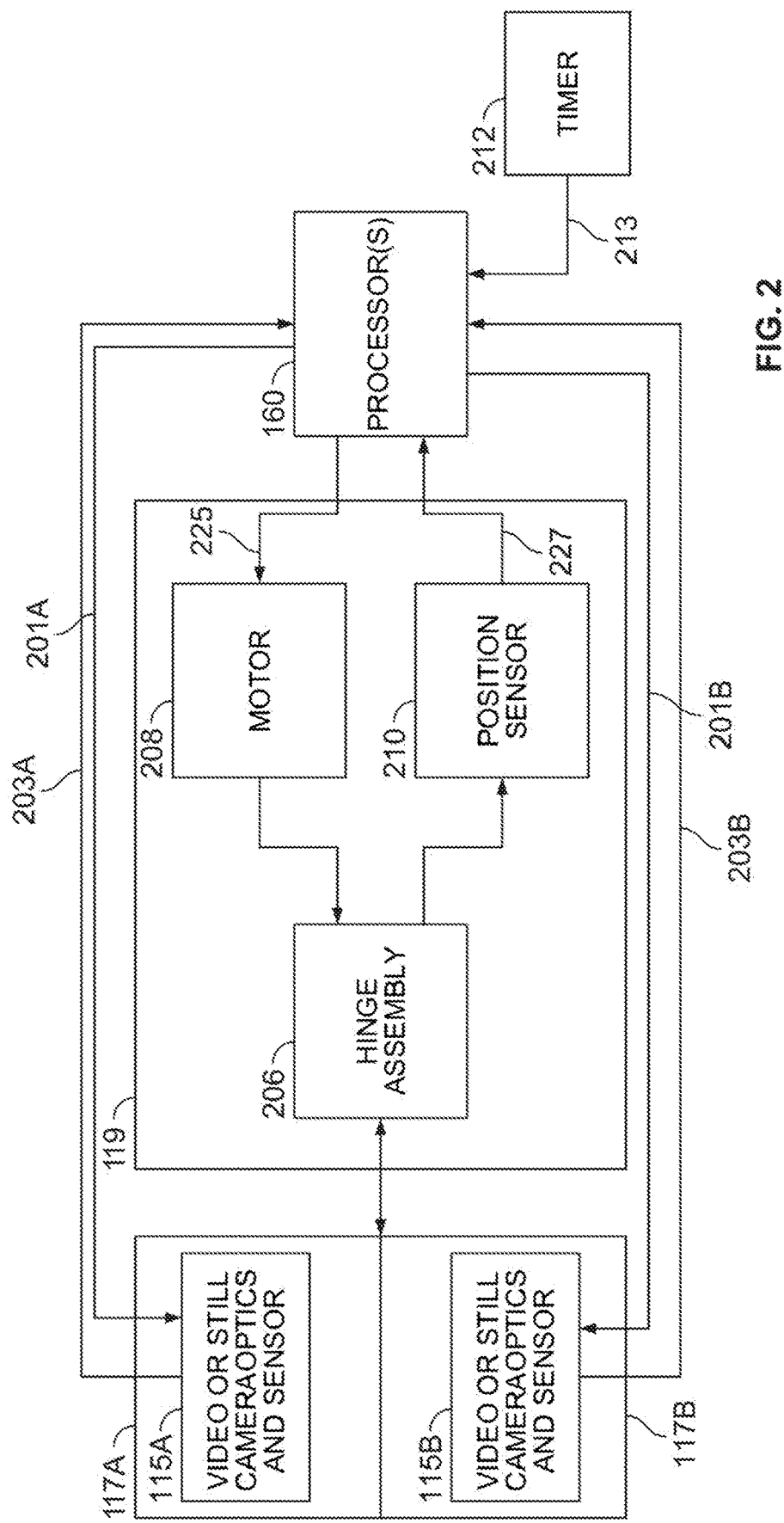
FIG. 2 is a block diagram illustrating exemplary components of the image capture device of FIG. 1, according to some implementations.

FIG. 2 is a diagram illustrating exemplary components of the image capture device 100 of FIG. 1. As illustrated, processor 160 is communicatively coupled to each of camera optics and sensor 115A and camera optics and sensor 115B. For example, processor 160 may provide an image capture command 201A to cause camera optics and sensor 115A to capture first image data 203A. Similarly, processor 160 may provide an image capture command 201B to cause camera optics and sensor 115B to capture second image data 203B. Camera optics and sensor 115A may disposed within (e.g., positioned on) a first portion 117A of image capture device 100, and camera optics sensor 115B may be disposed within a second portion 117B of image capture device 100. First portion 117A may include a first inner surface (e.g., user-facing surface) of a foldable display (e.g., foldable display 125), and second portion 117B may include a second inner surface of the foldable display. The image capture device 100 may be foldable along a center portion that separates the first portion 117A from the second portion 117B of the image capture device.

In some examples, image capture device 100 may include a timer 212. Time 212 may be an executable timer, in some examples. Processor 160 may receive timestamp data 213 from timer 212. Processor 160 may associate a timestamp with image data captured from either camera optics and sensor 115A and camera optics and sensor 115B. For example, upon receiving first image data 203A from camera optics and sensor 115A, processor 160 may request (e.g., read) a timestamp from timer 212. Processor 160 may obtain timestamp data 213 identifying the timestamp, and may associate the timestamp with the first image data 203A. For example, processor 160 may include the timestamp as metadata associated with first image data 203A. Similarly, upon receiving second image data 203B from camera optics and sensor 115B, processor 160 may request and obtain timestamp data 213 from timer 212, and may associate the obtained timestamp with second image data 203B.

Further, processor 160 is operably coupled to hinge control 119. In this example, hinge control 119 includes a motor 208, position sensor 210, and a hinge assembly 206. Hinge assembly 206 may include one or more hinges that connect the first portion 117A of image capture device 100 to the second portion 117B of image capture device 100. Motor 208 is operably coupled to hinge assembly 206, and is operable to adjust (e.g., open or close) the one or more hinges. For example, processor 160 may provide motor commands 225 to motor 208. In response, motor 208 may cause hinge assembly 206 to adjust the one or more hinges, thereby increasing or decreasing a hinge angle between first portion 117A and second portion 117B). For example, motor 208 may rotate in one direction (e.g., clockwise) to open the one or more hinges, and may rotate in another direction (e.g., counterclockwise) to close the one or more hinges.

Additionally, processor 160 may receive position data 227 from position sensor 210, where the position data 227 identifies a hinge angle of the one or more hinges of hinge assembly 206. In some examples, to adjust the hinge angle, processor 160 obtains position data 227 to determine a first hinge angle. To adjust the hinge angle to a second hinge angle, processor 160 may compare the second hinge angle to the first hinge angle. Based on the comparison, processor 160 may generate and provide a motor command 225 to adjust the hinge angle. For example, processor 160 may determine a difference between the second hinge angle and the first hinge angle. Processor 160 may then generate a motor command 225 that identifies the determined difference, and provides the motor command 225 to motor 208.

In some examples, image capture device 100 may adjust the hinge angle based on receiving user input, such as user input received via input device 170. For example, image capture device 100 may display a graphical user interface (GUI) (e.g., via foldable display 125) that allows the user to provide the user input. Based on the user input, processor 160 generates motor commands 225, and provides the motor commands 225 to motor 208 to adjust the hinge angle. In some examples, the GUI informs the user on whether to adjust (e.g., open or close) the hinge angle to optimize an image effect (e.g., maximize scene, diverse features for multi-view synthesis, Bokeh, etc.). For example, image capture device 100 may determine an object depth for an object within captured image data as described herein. Based on the determined object depth, image capture device 100 may inform the user, via one or more GUI elements, to provide input to adjust (e.g., open or close) the hinge angle to optimize the image effect. In some examples, image capture device 100 outputs a GUI element on a display, such as foldable display 125, based on the adjusted angle.

Figure 3A:
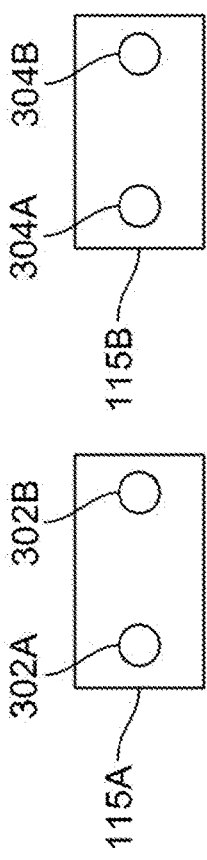
FIGS. 3A, 3B, 3C, and 3D are diagrams illustrating components of an exemplary image capture device, according to some implementations.
Figure 3B:

FIGS. 3A, 3B, 3C, and 3D illustrate exemplary camera configurations of each of camera optics and sensor 115A and camera optics and sensor 115B. For example, FIG. 3A illustrates a single camera 302 for camera optics and sensor 115A, and a single camera 304 for camera optics and sensor 115B. FIG. 3B illustrates camera optics and sensor 115A with a first camera 302A and a second camera 302B, and camera optics and sensor 115B with a first camera 304A and a second camera 304B. Although cameras 302A, and 302B, and cameras 304A and 304B are illustrated horizontally, they can be positioned vertically, or in any suitable configuration.

Figure 3C:
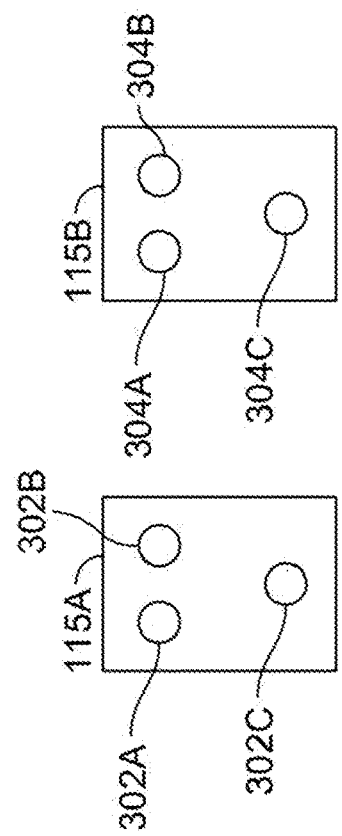
Figure 3D:
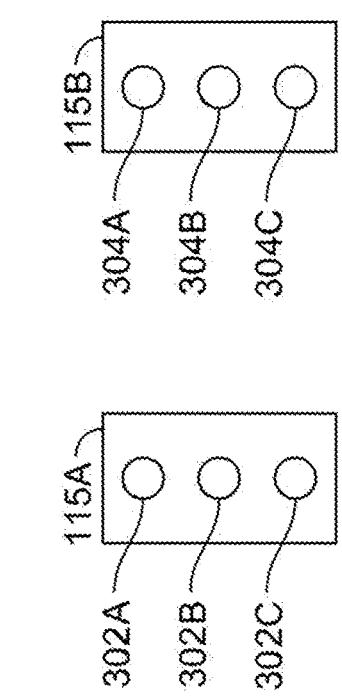

Further, FIG. 3C illustrates camera optics and sensor 115A with a first camera 302A, a second camera 302B, and a third camera 302C. Camera optics and sensor 115B includes a first camera 304A, a second camera 304B, and a third camera 304C. Although the cameras 302A, 302B, 302C and cameras 304A, 304B, 304C are illustrated vertically, they can be positioned horizontally, or in any suitable configuration. For example, FIG. 3D illustrates cameras 302A, 302B, 302C of camera optics and sensor 115A in a "Y" formation (e.g., an inverted triangle formation). FIG. 3D also illustrates cameras 304A, 304B, 304C of camera optics and sensor 115B in a similar "Y" formation.

Figure 4A:
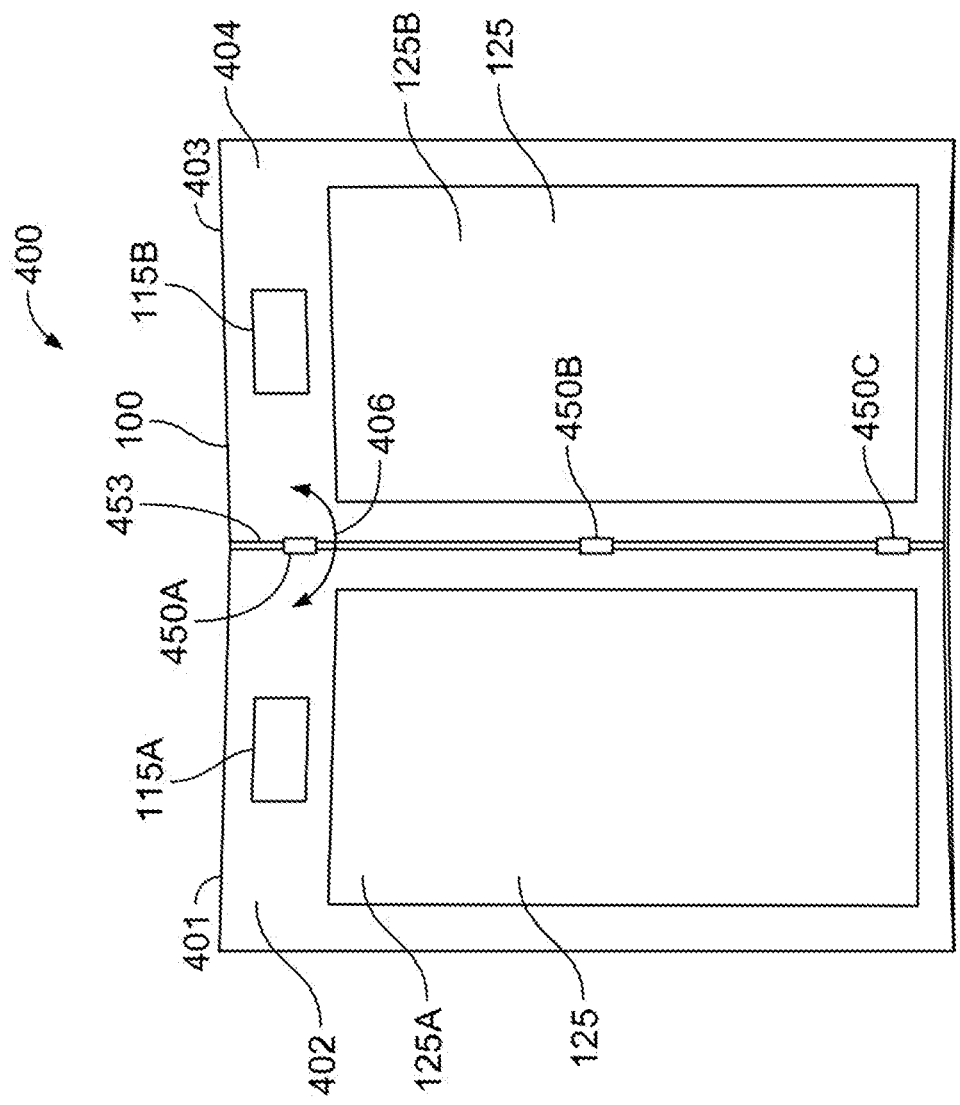
FIGS. 4A, 4B, 4C, and 4D are diagrams illustrating an exemplary image capture device with a foldable display, according to some implementations.
Figure 4B:
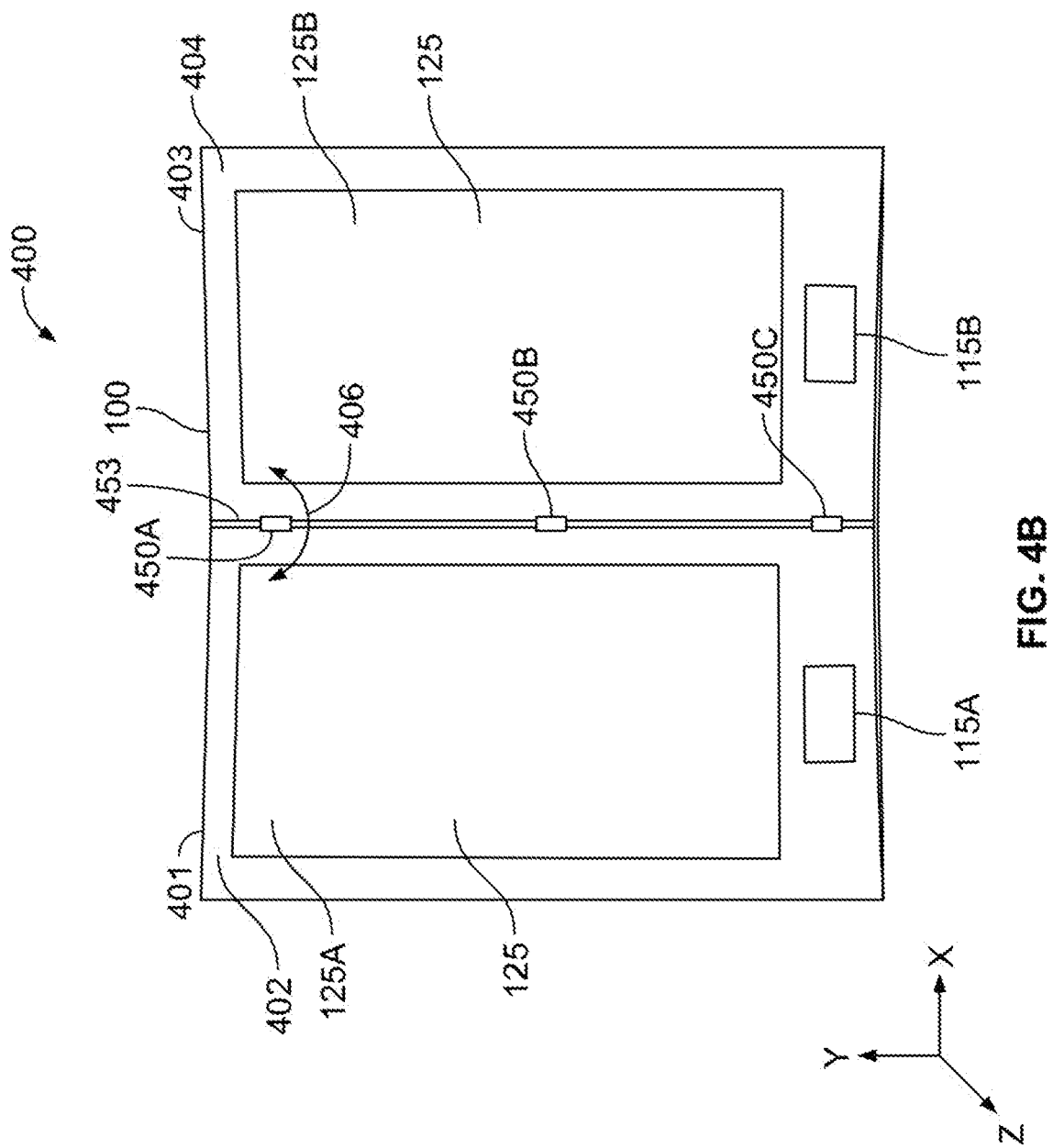
Figure 4C:
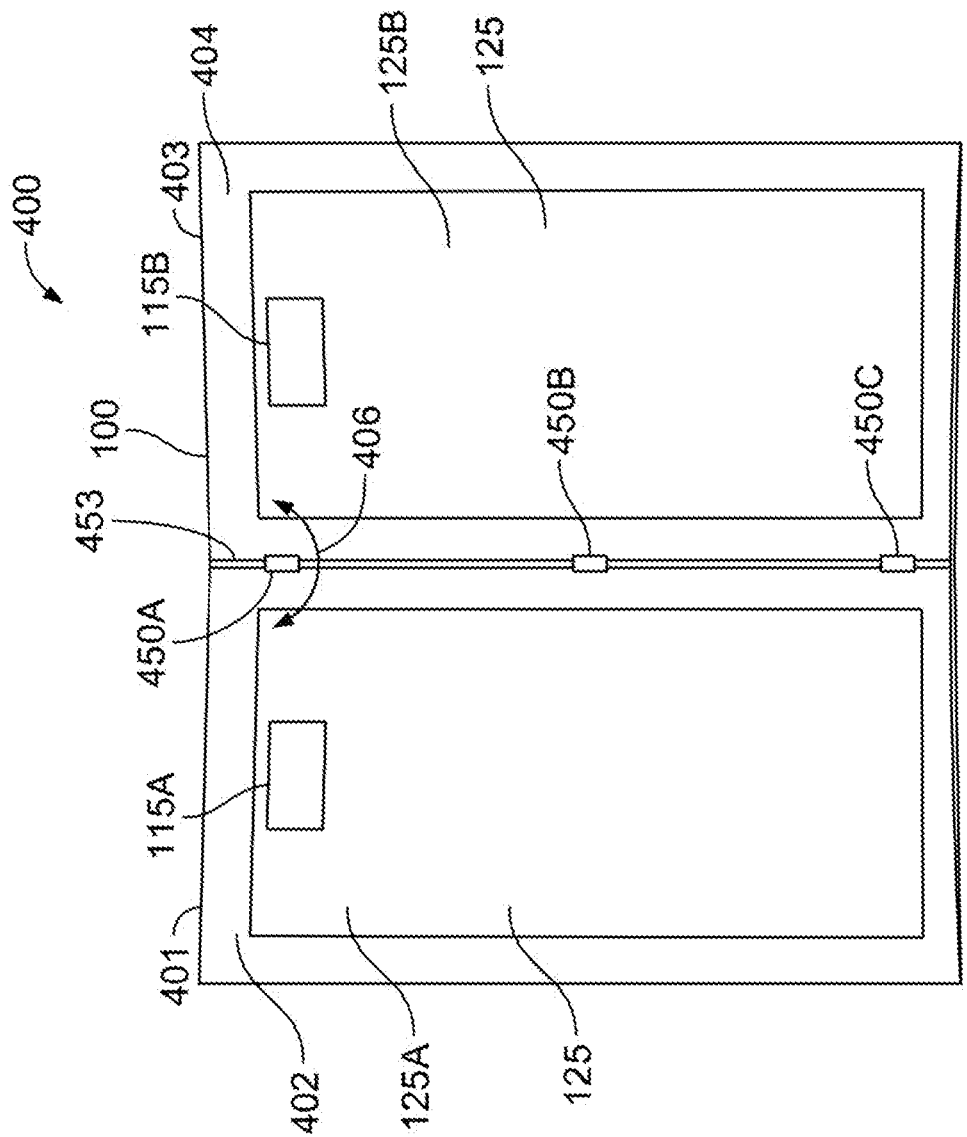

FIGS. 4A, 4B, and 4C illustrate a foldable device 400 that includes image capture device 100 and foldable display 125. Foldable device 400 may be a foldable smartphone or tablet, for example. Foldable device 400 may include a housing having a first portion 401 and a second portion 403. First portion 401 can fold relative to second portion 403. Each of first portion 401 and second portion 403 may include one or more displays. For example, as illustrated, foldable display 125 includes a first display portion 125A, which may be disposed within first portion 401, and a second display portion 125B, which may be disposed within second portion 403. First display portion 125A and first display portion 125B may be communicatively coupled to a processor 160 (not shown in FIGS. 4A, 4B, and 4C). Each of the first portion 401 and the second portion 403 of the housing may also include one or more camera optics and sensors, such as camera optics and sensors 115A, 115B. Each of camera optics and sensor 115A and 115B may include any number of cameras arranged or disposed in any suitable configuration, such as in the configurations illustrated with respect to FIGS. 3A, 3B, 3C, and 3D.

Further, as illustrated in FIG. 4A, camera optics and sensor 115A may be positioned along a first surface 402 of first portion 401 of the housing of foldable device 400, while camera optics and sensor 115B may be positioned along a second surface 404 of second device portion 403 of the housing of foldable device 400. Further, and by way of example, camera optics and sensor 115A may be positioned above first display portion 125A, along a corresponding vertical axis (e.g., the "Y" axis of FIG. 4A), and camera optics and sensor 115B may be positioned above second display portion 125B along a corresponding vertical axis In further examples, illustrated in FIG. 4B, camera optics and sensor 115A may be positioned below first display portion 125A along the corresponding vertical axis, and camera optics and sensor 115A may be positioned below second display portion 125B along the corresponding vertical axis.

In additional examples, illustrated in FIG. 4C, camera optics and sensor 115A may be positioned underneath a surface of first display portion 125A, while camera optics and sensor 115B may be positioned underneath a surface of second display portion 125B. As camera optics and sensor 115A and camera optics and sensor 115B are each positioned underneath the surface of a respective one of first display portion 125A and second display portion, light may pass through first display portion 125A and second display portion 125B, respectively, before impinging the corresponding sensor. Further, although in FIG. 4C each of camera optics and sensor 115A and camera optics and sensor 115B are illustrated near a top portion of first display portion 125A and second display portion 125B, respectively, in some examples, each of camera optics and sensor 115A and camera optics and sensor 115B may be disposed fully or partially, underneath any additional, or alternate, portion of first display portion 125A and second display portion 125B, respectively.

A center portion 453 of foldable device 400 may include one or more hinges, such as 450A, 450B, 450C, that couple the first portion 401 to the second portion 403. The hinges 450A, 450B, 450C enable first portion 401 to fold relative to second portion 403, such as to allow for the opening and closing of foldable device 400. By way of example, processor 160 may execute hinge angle control engine 147 to adjust a hinge angle 406 formed between the first inner surface 402 of the first portion 401 and the second inner surface 404 of the second portion 403 based on commands generated and provisioned to a corresponding motor (e.g., motor 208) coupled to one or more of hinges 450A, 450B, or 450C. Additionally, in some examples, an operator or user of foldable device 400 may adjust manually hinge angle 406 based a graphical user interface presented on portions of display 125.

Figure 4D:
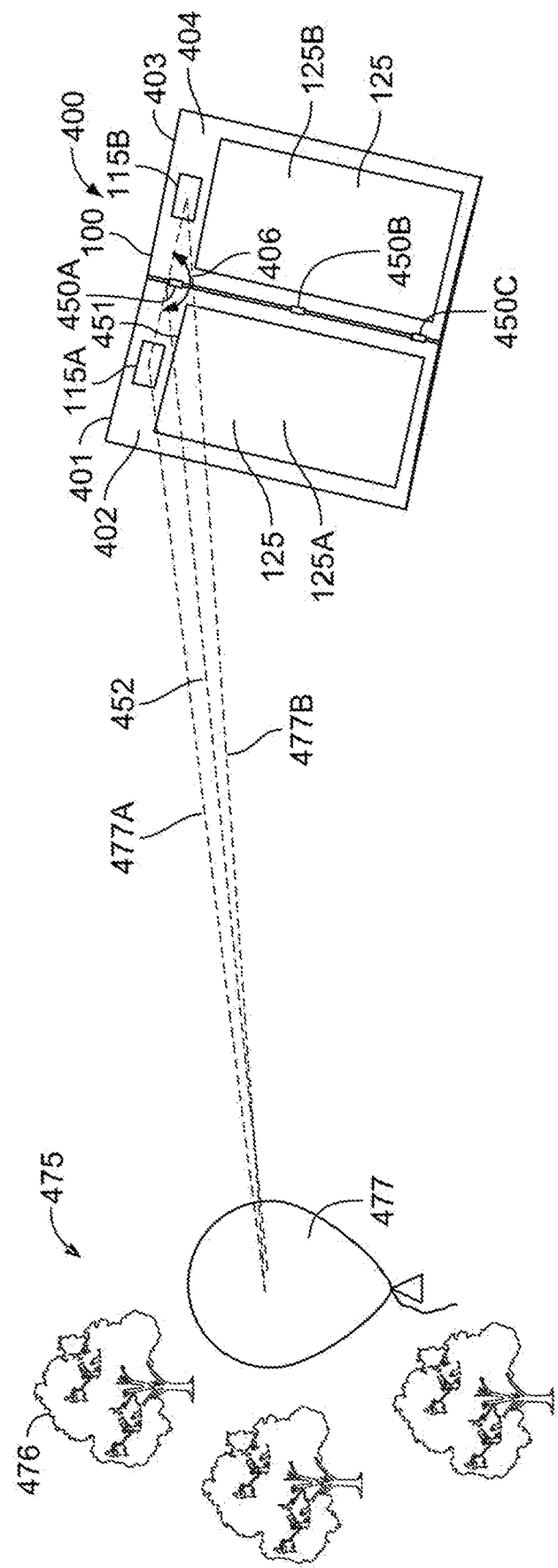

FIG. 4D illustrates foldable device 400 capturing an image of a scene 475. Scene 475 includes, for example, a plurality of trees 476 and a balloon 477. In this example, a camera, such as camera 302, of camera optics and sensor 115A has a focal length 477A with respect to balloon 477 of scene 475. Similarly, a camera of camera optics and sensor 115A has a focal length 477B with respect to balloon 477 of scene 475. Further, at current hinge angle 406, the camera of camera optics and sensor 115A is a baseline length 451 from the camera of camera optics and sensor 115B. The baseline length 451 for each of a plurality of ranges of hinge angles 406 may be determined during calibration of image capture device 100, and may be stored in a non-volatile memory, such as storage medium 110. For example, image capture device 100 may determine a current hinge angle 406 as described herein, and may determine a corresponding baseline length 451 (e.g., from a camera of camera optics and sensor 115A to a camera of camera optics and sensor 115B) based on a table stored in storage medium 110 that maps hinge angles 406 to baseline lengths 451.

Processor 160 may execute capture control instructions 135 to capture first image data of scene 475 from camera optics and sensor 115A, and to capture second image data of scene 475 from camera optics and sensor 115A. Further, processor 160 may execute depth determination engine 146 as described herein to identify features of scene 475, such as balloon 477, and to determine a disparity map based on the first image data and the second image data. The disparity may identify depth values associated with corresponding pixels of first image data and second image data. For example, the disparity map may include depth values that correspond to a depth 452 from the baseline length 451 to the balloon 477.

Processor 160 may then adjust hinge angle 406 based on extrinsic and intrinsic parameters corresponding to each of the cameras, and the disparity map. Processor 160 may adjust the hinge angle 406 to align image data captured with camera optics and sensor 115A to image data captured with camera optics and sensor 115B. For example, after adjusting the hinge angle 406, processor 160 may execute capture control instructions 135 to capture third image data of scene 475 from camera optics and sensor 115A, and to capture fourth image data of scene 475 from camera optics and sensor 115B. Third image data may be more aligned to fourth image data than, for example, an alignment of the first image data to the second image data. Processor 160 may execute depth determination engine 146 to generate a second disparity map based on the third image data and the fourth image data.

Processor 160 may execute image processing instructions 143 to generate a multi-view image, such as a 3D image, based on the third image data, the fourth image data, and the second disparity map. In some examples, processor 160 may execute face detection engine 144 to identify a face of a subject within the generated multi-view image.

In some examples, processor 160 may execute photoeffects engine 153 to apply one or more photoeffects to the generated multi-view image. For example, executed photo-effects engine 153 may apply color shifts, depth of field (e.g., Bokeh effects), AR, VR, averaging effects, or any other image capture enhancements to the multi-view image.

Figure 5:
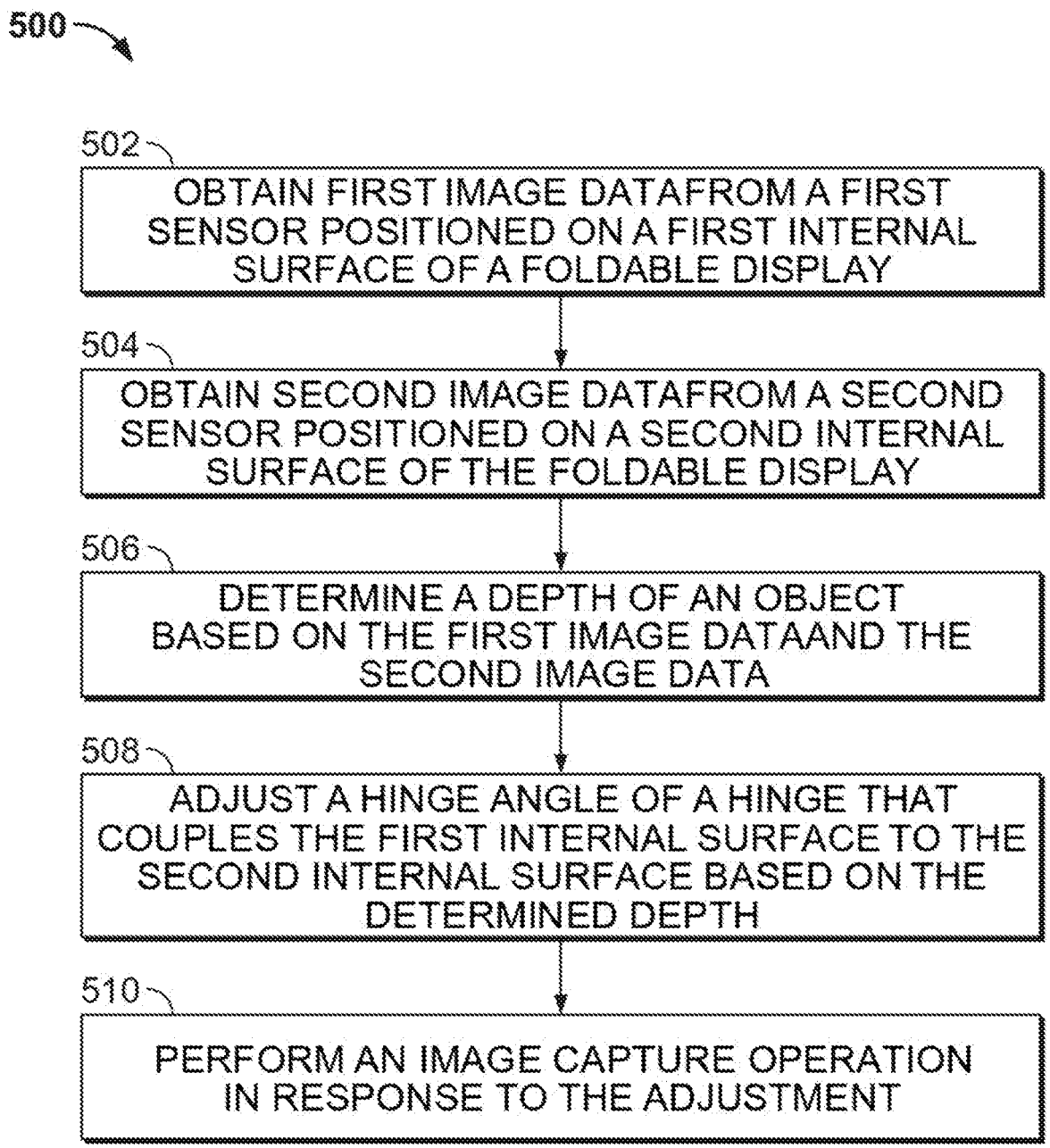
FIGS. 5 and 6 are flowcharts of exemplary processes for performing an image capture operation in an image capture device, according to some implementations.

FIG. 5 is a flowchart of an example process 500 for capturing an image based on an adjusted hinge angle, in accordance with one implementation. Process 500 may be performed by one or more processors executing instructions locally at an image capture device, such as processor 160 of image capture device 100 of FIG. 1. Accordingly, the various operations of process 500 may be represented by executable instructions held in storage media of one or more computing platforms, such as storage medium 110 of image capture device 100.

Referring to block 502, image capture device 100 may obtain first image data from a first sensor, such as image data from camera optics and sensor 115A. The first sensor may be positioned on a first internal surface of a foldable display. For example, camera optics and sensor 115A may be positioned on a surface of first display portion 125A of foldable display 125. At block 504, image capture device 100 may obtain second image data from a second image sensor, such as image data from camera optics and sensor 115B. The second sensor is positioned on a second internal surface of the foldable display. For example, camera optics and sensor 115B may be positioned on a surface of second display portion 125B of foldable display 125.

At block 506, image capture device 100 may determine a depth of an object based on the first image data and the second image data. For example, and as described herein, image capture device 100 may identify features (e.g., balloon 477) in each of the first image data and the second image data. According to some examples, image capture device 100 matches pixels having key items in the first image data with pixels having corresponding key items in the second image data. Image capture device 100 then generates a disparity map using any technique known in the art. The disparity map may indicate a scene depth at each corresponding pixel location. Image capture device 100 may compute depth values based on a focal length (e.g., 477A) of each camera, a baseline length (e.g., baseline length 451), and the disparity map.

Proceeding to block 508, image capture device 100 adjusts a hinge angle of a hinge that couples the first internal surface to the second internal surface based on the determined depth. For example, image capture device 100 may increase or decrease a hinge angle, such as hinge angle 406 of FIG. 4A, based on the determined depth. At block 510, image capture device 100 performs an image capture operation in response to the adjustment. For example, image capture device 100 may obtain third image data from the first sensor, and fourth image data from the second sensor. Image capture device 100 may identify corresponding features within the third image data and the fourth image data, and generate a second disparity map based on the identified features. Image capture device 100 may then generate a multi-view image based on the third image data, the fourth image data, and the second disparity map.

Figure 6:
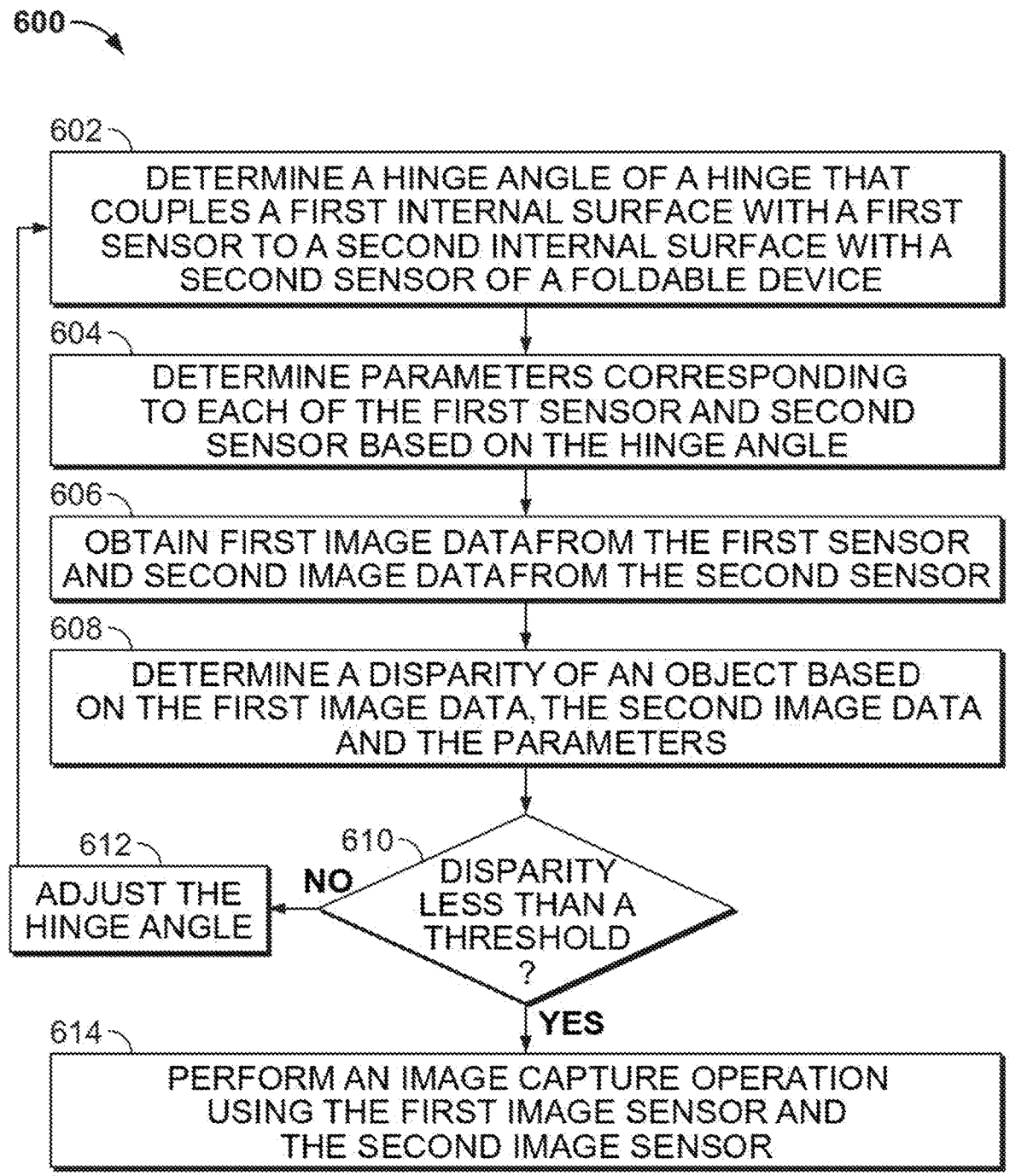

FIG. 6 is a flowchart of an example process 600 for performing an image capture operation, in accordance with one implementation. Process 600 may be performed by one or more processors executing instructions locally at an image capture device, such as processor 160 of image capture device 100 of FIG. 1. Accordingly, the various operations of process 600 may be represented by executable instructions held in storage media of one or more computing platforms, such as storage medium 110 of image capture device 100.

Referring to block 602, image capture device 100 may determine a hinge angle, such as hinge angle 406, of a hinge, such as a hinge 450A. The hinge couples a first internal surface (e.g., first inner surface 402) with a first sensor (e.g., camera optics and sensor 115A) of a foldable device (e.g., foldable device 400) to a second internal surface (e.g., second inner surface 404) with a second sensor (e.g., camera optics and sensor 115B) of the foldable device. For example, image capture device 100 may obtain position data 227 from a position sensor 210 to determine the hinge angle, for example.

At block 604, image capture device 100 may determine values of parameters corresponding to each of the first sensor and the second sensor based on the hinge angle. For example, storage medium 110 may store intrinsic parameters 167 and extrinsic parameters 169 for each of the sensors. Further, the intrinsic parameters 167 and extrinsic parameters 169 may include parameters for a plurality of hinge range angles. For example, a first set of intrinsic parameters 167 and extrinsic parameters 169 may correspond to a first range of hinge angles (e.g., from 0 degrees up to 5 degrees), a second set of intrinsic parameters 167 and extrinsic parameters 169 may correspond to a first range of hinge angles (e.g., from 5 degrees up to 10 degrees), and so on. In some examples, each hinge angle has corresponding intrinsic and extrinsic parameters. Image capture device 100 may obtain, for each of the first sensor and the second sensor, intrinsic parameters 167 and extrinsic parameters 169 corresponding to the determined hinge angle.

Proceeding to block 606, image capture device 100 may obtain first image data from the first sensor, and second image data from the second sensor. For example, image capture device 100 may obtain image data 203A from camera optics and sensor 115A, and image data 203B from camera optics and sensor 115B. At block 608, image capture device 100 may determine a disparity of an object based on the first image data, the second image data, and the parameters. For example, image capture device 100 may identify an object within the first image data and the second image data, and may generate a disparity map that includes disparity values for the object based on extrinsic and intrinsic parameters corresponding to each camera, as described herein. Image capture device 100 may apply any known technique to the disparity values to determine a disparity of the object. For example, image capture device 100 may determine an average of the disparity values to determine the disparity for the object.

At block 610, image capture device 100 may determine whether the determined disparity is less than a threshold. For example, the threshold disparity may include a predetermined threshold value, which image capture device 100 may maintain within storage medium 110. If the disparity were not less than the threshold, the method proceeds to block 612, and image capture device 100 may adjust the hinge angle. For example, image capture device 100 may provide a motor command 225 to motor 208 to adjust a hinge angle (e.g., hinge angle 406) of a hinge (e.g., 450A) of hinge assembly 206. Method 600 then proceeds back to block 602.

Referring back to block 610, if the determined disparity were less than the threshold disparity, the method proceeds to block 614, where image capture device 100 performs an image capture operation using the first image sensor and the second image sensor. For example, image capture device 100 may obtain third image data from the first sensor, and further image data from the second sensor. Image captured device 100 may determine a disparity map based on the third image data and the fourth image data (and in some examples, corresponding camera parameters), and may generate a multi-view image based on the third image data, fourth image data, and disparity map, using any process as described herein.

Figure 7:
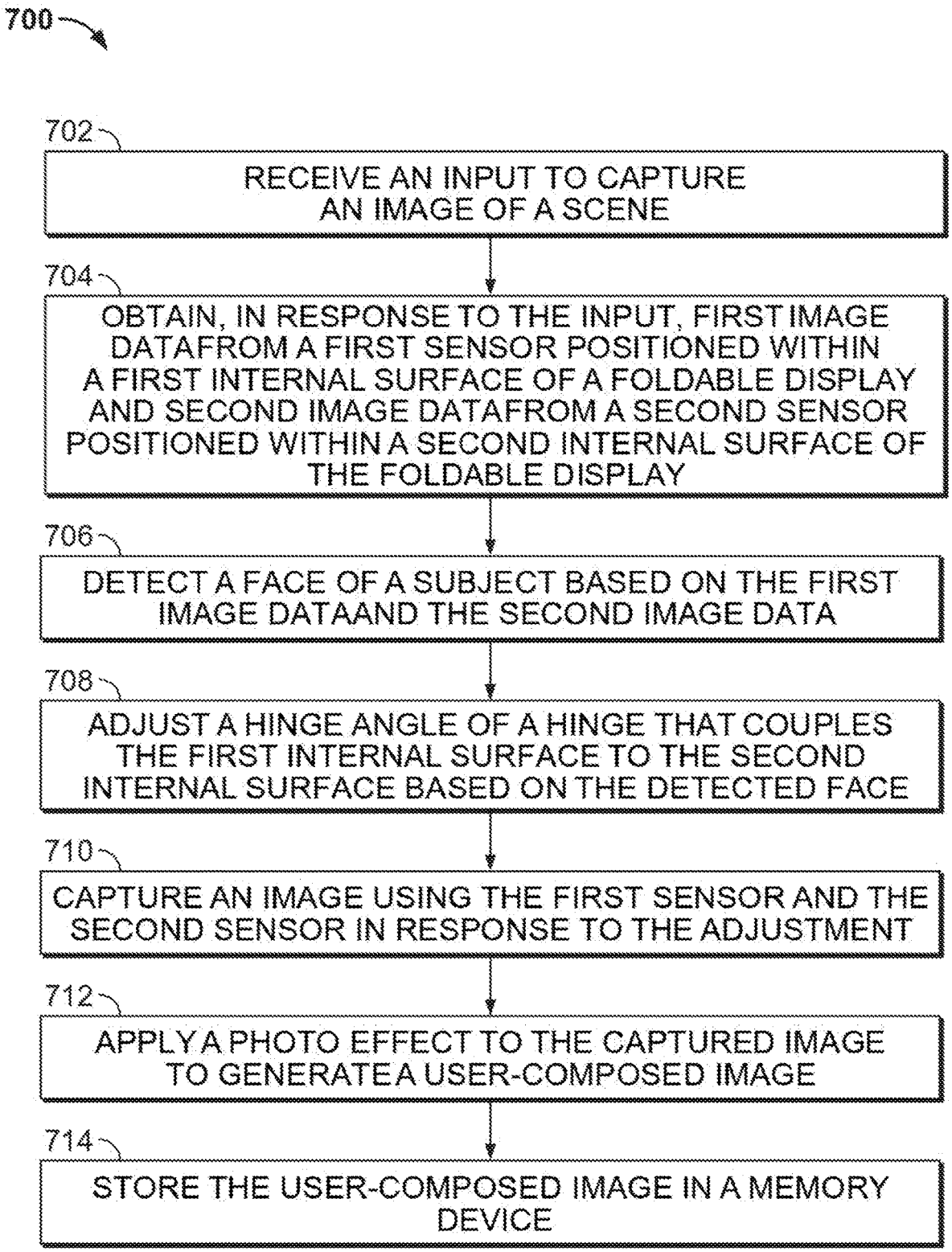
FIG. 7 is a flowchart of an exemplary process for generating a user-composed image in an image capture device, according to some implementations.

FIG. 7 is a flowchart of an example process 700 for generating a user-composed image, in accordance with one implementation. Process 700 may be performed by one or more processors executing instructions locally at an image capture device, such as processor 160 of image capture device 100 of FIG. 1. Accordingly, the various operations of process 700 may be represented by executable instructions held in storage media of one or more computing platforms, such as storage medium 110 of image capture device 100.

At block 702, image capture device 100 may receive an input to capture an image of a scene. For example, a user may provide an input (e.g., via I/O 170) to capture an image (e.g., take a picture) of a scene (e.g., scene 475). At block 704, in response to the input, image capture device 100 obtains first image data from a first sensor positioned within a first internal surface of a foldable display. The image capture device also obtains second image data from a second sensor positioned within a second internal surface of the foldable display. For example, camera optics and sensor 115A may be positioned within first display portion 125A of display 125, and camera optics and sensor 115B may be positioned within second display portion 125B of the display 125.

Proceeding to block 706, image capture device 100 may detect a face of a subject based on the first image data and the second image data. For example, image capture device 100 may detect a face of a subject within a ROI of first image data and second image data. Further, at block 708, image capture device 100 may adjust a hinge angle based on the detected face. The hinge angle (e.g., hinge angle 406) couples the first internal surface of the foldable display to the second internal surface of the foldable display. For example, image capture device 100 may determine disparity values for the face, and may compute depth values for the face based on a focal length of the first sensor, a baseline length between the first sensor and the second sensor, and the disparity values. Image capture device may then adjust the hinge angle based on the depth values.

At block 710, image capture device 100 may capture an image using the first sensor and the second sensor in response to the hinge angle adjustment. For example, image capture device 100 may obtain third image data from the first sensor, and fourth image data from the fourth sensor. Image capture device 100 may determine a disparity map based on the third image data and the fourth image data, and generate a multi-view image based on the disparity map, the third image data, and the fourth image data, as described herein.

Proceeding to block 712, image capture device 100 may apply a photoeffect to the captured image to generate a user-composed image. For example, image capture device 100 may apply any photoeffect selected by a user, such as a Bokeh effect, to the multi-view image to generate the user-composed image. At block 714, image capture device 100 may store the user-composed image within a corresponding tangible, non-transitory memory, such as storage medium 110.

Implementation examples are further described in the following numbered clauses:

1. An image capture device, comprising:
   a housing comprising a first housing portion and a second housing portion;
   a non-transitory, machine-readable storage medium storing instructions; and
   at least one processor coupled to the non-transitory, machine-readable storage medium, the at least one processor being configured to execute the instructions to:
      obtain first image data from a first sensor coupled to the first housing portion of the housing;
      obtain second image data from a second sensor coupled to the second housing portion of the housing;
      determine a depth of an object based on the first image data and the second image data;
      output an adjusted angle between the first housing portion and the second housing portion based on the depth; and
      perform an image capture operation based on the adjusted angle.

2. The image capture device of clause 1, wherein the at least one processor is further configured to execute the instructions to:
   based on the output of the adjusted angle, obtain third image data from the first sensor and fourth image data from the second sensor; and
   generate a multi-view image based on the third sensor data and the fourth sensor data.

3. The image capture device of clause 2, wherein the at least one processor is further configured to execute the instructions to:
   generate a user-composed image based on an application of a photoeffect to the multi-view image; and
   store the user-composed image in the non-transitory, machine-readable storage medium.

4. The image capture device of clause 3, the at least one processor is further configured to execute the instructions to:
   segment the multi-view image; and
   apply the photoeffect based on the segmented multi-view image.

5. The image capture device of clause 4, wherein the photoeffect comprises a Bokeh effect.

6. The image capture device of any of clauses 1-5, wherein:
the object comprises a face; and
the at least one processor is further configured to execute the instructions to detect the face.

7. The image capture device of any of clauses 1-6, wherein the at least one processor is further configured to execute the instructions to:
determine an angle between the first housing portion and the second housing portion; and
determine the depth of the object based on the angle.

8. The image capture device of any of clauses 1-7, wherein the at least one processor is further configured to execute the instructions to generate disparity data based on the first image data and the second image data.

9. The image capture device of clause 8, wherein the at least one processor is further configured to execute the instructions to:
determine an angle between the first portion and the second portion of the housing;
determine a baseline length between the first sensor and the second sensor based on the determined angle;
determine a focal length of at least one of the first sensor or the second sensor; and
generate depth values based on the disparity data, the baseline length, and the focal length.

10. The image capture device of any of clauses 8-9, wherein the at least one processor is further configured to execute the instructions to:
determine a disparity of the object based on the disparity data; and
output the adjusted angle based on the disparity and a disparity threshold.

11. The image capture device of any of clauses 1-10, wherein the at least one processor is further configured to execute the instructions to:
obtain position data from a position sensor;
determine an angle between the first housing portion relative to the second housing portion based on the position data; and
determine the adjusted angle based on the determined angle.

12. The image capture device of any of clauses 1-11, wherein the at least one processor is further configured to execute the instructions to:
determine an angle between the first housing portion and the second housing portion;
determine one or more camera parameters based on the determined angle; and
output the adjusted angle based on the one or more camera parameters.

13. The image capture device of claim 12, wherein:
the one or more camera parameters comprise a translation matrix; and
the at least one processor is further configured to execute the instructions to translate a reference of the first sensor to a corresponding reference of the second sensor based on the translation matrix.

14. The image capture device of any of clauses 1-13 wherein:
the first housing portion comprises a first portion of a display;
the second housing portion comprises a second portion of the display; and
the first sensor is disposed underneath the first portion of the display, and the second sensor is disposed underneath the second portion of the display.

15. The image capture device of any of clauses 1-14, further comprising a motor.

16. The image capture device of clause 15, wherein the motor is configured to adjust an angle between the first housing portion and the second housing portion based on the adjusted angle.

17. The image capture device of any of clauses 1-16, wherein the processor is further configured to execute the instructions to output a GUI element on a display based on the adjusted angle.

18. A method for operating an image capture device, comprising:
obtaining first image data from a first sensor coupled to a first portion of a housing of the image capture device;
obtaining second image data from a second sensor coupled to a second portion of the housing;
determining a depth of an object based on the first image data and the second image data;
outputting an adjusted angle between the first housing portion and the second housing portion based on the determined depth; and
performing an image capture operation based on the adjusted angle.

19. The method of clause 18, wherein performing the image capture operation comprises:
based on the output of the adjusted angle, obtaining third image data from the first sensor and fourth image data from the second sensor; and
generating a multi-view image based on the third sensor data and the fourth sensor data.

20. The method of clause 19, further comprising:
generating a user-composed image based on an application of a photoeffect to the multi-view image; and
storing the user-composed image in a memory device.

21. The method of clause 20, further comprising:
segmenting the multi-view image; and
applying the photoeffect based on the segmented multi-view image.

22. The method of clause 21, wherein the photoeffect comprises a Bokeh effect.

23. The method of any of clauses 18-22, wherein the object comprises a face, the method further comprising detecting the face.

24. The method of any of clauses 18-23, further comprising:
determining an angle between the first housing portion and the second housing portion of the housing; and
determining the depth of the object based on the angle.

25. The method of any of clauses 18-22, wherein determining the depth of the object comprises generating disparity data based on the first image data and the second image data.

26. The method of clause 25, wherein determining the depth of the object comprises:
determining an angle between the first housing portion and the second housing portion;
determining a baseline length between the first sensor and the second sensor based on the determined angle;
determining a focal length of at least one of the first sensor or the second sensor; and
generating depth values based on the disparity data, the baseline length, and the focal length.

27. The method of any of clauses 25-26, further comprising:

determining a disparity of the object based on the disparity data; and outputting the adjusted angle based on the disparity and a disparity threshold.

28. The method of any of clauses 18-27, further comprising:
obtaining position data from a position sensor;
determining an angle between the first housing portion relative to the second housing portion; and
determining the adjusted angle based on the determined angle.

29. The method of clauses 18-28, further comprising:
determining an angle between the first housing portion and the second housing portion;
determining one or more camera parameters based on the determined angle; and
outputting the adjusted angle based on the one or more camera parameters.

30. The method of clause 29, wherein:
the one or more camera parameters comprise a translation matrix; and
the method further comprises translating a reference of the first sensor to a corresponding reference of the second sensor based on the translation matrix.

31. The method of any of clauses 18-30, further comprising outputting a GUI element on a display based on the adjusted angle.

32. A non-transitory, machine-readable storage medium storing instructions that, when executed by at least one processor, cause the at least one processor to perform operations, comprising:
obtaining first image data from a first sensor coupled to a first housing portion of a housing of an image capture device;
obtaining second image data from a second sensor coupled to a second housing portion of the housing;
determining a depth of an object based on the first image data and the second image data;
outputting an adjusted angle between the first portion and the second portion based on the depth; and
performing an image capture operation based on the adjusted angle.

33. The non-transitory, machine-readable storage medium of clause 32, wherein performing the at least one image capture operation comprises:
based on the output of the adjusted angle, obtaining third image data from the first sensor and fourth image data from the second sensor; and
generating a multi-view image based on the third sensor data and the fourth sensor data.

34. The non-transitory, machine-readable storage medium of clause 33, wherein the instructions, when executed by the at least one processor, cause the at least one processor to perform further operations, comprising:
generating a user-composed image based on an application of a photoeffect to the multi-view image; and
storing the user-composed image in a memory device.

35. The non-transitory, machine-readable storage medium of clause 34, wherein the instructions, when executed by the at least one processor, cause the at least one processor to perform further operations, comprising:
segmenting the multi-view image; and
applying the photoeffect based on the segmented multi-view image.

36. The non-transitory, machine-readable storage medium of clause 35, wherein the photoeffect comprises a Bokeh effect.

37. The non-transitory, machine-readable storage medium of any of clauses 32-36, wherein the instructions, when executed by the at least one processor, cause the at least one processor to perform further operations, comprising detecting a face, wherein the object comprises the detected face.

38. The non-transitory, machine-readable storage medium of any of clauses 32-37, wherein the instructions, when executed by the at least one processor, cause the at least one processor to perform further operations, comprising:
determining an angle between the first housing portion and the second housing portion of the housing; and
determining the depth of the object based on the angle.

39. The non-transitory, machine-readable storage medium of any of clauses 32-38, wherein determining the depth of the object comprises generating disparity data based on the first image data and the second image data.

40. The non-transitory, machine-readable storage medium of clause 39, wherein determining the depth of the object comprises:
determining an angle between the first housing portion and the second housing portion;
determining a baseline length between the first sensor and the second sensor based on the determined angle;
determining a focal length of at least one of the first sensor or the second sensor; and
generating depth values based on the disparity data, the baseline length, and the focal length.

41. The non-transitory, machine-readable storage medium of any of clauses 39 and 40, wherein the instructions, when executed by the at least one processor, cause the at least one processor to perform further operations, comprising:
determining a disparity of the object based on the disparity data; and,
outputting the adjusted angle between the first portion and the second portion is based on the disparity and a disparity threshold.

42. The non-transitory, machine-readable storage medium of any of clauses 32-41, wherein the instructions, when executed by the at least one processor, cause the at least one processor to perform further operations, comprising:
obtaining position data from a position sensor;
determining an angle between the first housing portion relative to the second housing portion; and
determining the adjusted angle based on the determined angle.

43. The non-transitory, machine-readable storage medium of any of clauses 32-42, wherein determining the depth of the object further comprises:
determining an angle between the first housing portion and the second housing portion;
determining one or more camera parameters based on the determined angle, wherein outputting the adjusted angle is based on the one or more camera parameters; and outputting the adjusted angle based on the one or more camera parameters.

44. The non-transitory, machine-readable storage medium of clause 43, wherein the one or more camera parameters comprise a translation matrix, and wherein the instructions, when executed by the at least one processor, cause the at least one processor to perform further operations, comprising translating a reference of the first sensor to a corresponding reference of the second sensor based on the translation matrix.

45. The non-transitory, machine-readable storage medium of any of clauses 32-44, wherein the instructions, when executed by the at least one processor, cause the at least one processor to perform further operations, comprising outputting a GUI element on a display based on the adjusted angle.

46. A system, comprising:
   a means for obtaining first image data from a first sensor coupled to a first housing portion of a housing of an image capture device;
   a means for obtaining second image data from a second sensor coupled to a second housing portion of the housing;
   a means for determining a depth of an object based on the first image data and the second image data;
   a means for outputting an adjusted angle between the first portion and the second portion based on the depth; and
   a means for performing an image capture operation based on the adjusted angle.

47. The system of clause 46, wherein the means for performing the at least one image capture operation comprises:
   a means for obtaining, based on the output of the adjusted angle, third image data from the first sensor and fourth image data from the second sensor; and
   a means for generating a multi-view image based on the third sensor data and the fourth sensor data.

48. The system of clause 47, further comprising: a means for generating a user-composed image based on an application of a photoeffect to the multi-view image; and a means for storing the user-composed image in a memory device.

49. The system of clause 48, further comprising:
   a means for segmenting the multi-view image; and
   a means for applying the photoeffect based on the segmented multi-view image.

50. The system of clause 49, wherein the photoeffect comprises a Bokeh effect.

51. The system of any of clauses 46-50, further comprising a means for detecting a face, wherein the object comprises the face.

52. The system of any of clauses 46-51, further comprising:
   a means for determining an angle between the first housing portion and the second housing portion of the housing; and
   a means for determining the depth of the object based on the angle.

53. The system of any of clauses 46-52, wherein the means for determining the depth of the object comprises a means for generating disparity data based on the first image data and the second image data.

54. The system of clause 53, wherein the means for determining the depth of the object comprises:
   a means for determining an angle between the first housing portion and the second housing portion;
   a means for determining a baseline length between the first sensor and the second sensor based on the determined angle;
   a means for determining a focal length of at least one of the first sensor or the second sensor; and
   a means for generating depth values based on the disparity data, the baseline length, and the focal length.

55. The system of any of clauses 53 and 54, further comprising:
   a means for determining a disparity of the object based on the disparity map; and a means for outputting the adjusted angle based on the disparity and a disparity threshold.

56. The system of any of clauses 46-55, further comprising:
   a means for obtaining position data from a position sensor;
   a means for determining an angle between the first housing portion relative to the second housing portion; and
   a means for determining the adjusted angle based on the determined angle.

57. The system of any of clauses 46-55, further comprising:
   a means for determining an angle between the first housing portion and the second housing portion; and
   a means for determining one or more camera parameters based on the determined angle; and
   a means for outputting the adjusted angle based on the one or more camera parameters.

58. The system of clause 57, wherein:
   the one or more camera parameters comprise a translation matrix; and
   the system further comprises a means for translating a reference of the first sensor to a corresponding reference of the second sensor based on the translation matrix.

59. The system of any of clauses 46-58 wherein:
   the first housing portion comprises a first portion of a display;
   the second housing portion comprises a second portion of the display; and
   the first sensor is disposed underneath the first portion of the display, and the second sensor is disposed underneath the second portion of the display.

60. The system of any of clauses 46-59, further comprising a means to adjust an angle between the first housing portion and the second housing portion based on the adjusted angle.

61. The system of any of clauses 46-60, further comprising a means to output a GUI element on a display based on the adjusted angle.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, computer program code segments configure the processor to create specific logic circuits. The methods may alternatively be at least partially embodied in application specific integrated circuits for performing the methods.

The invention claimed is:

1. An image capture device comprising:
   a housing comprising a first housing portion and a second housing portion;
   a non-transitory, machine-readable storage medium storing instructions; and
   at least one processor coupled to the non-transitory, machine-readable storage medium, the at least one processor being configured to execute the instructions to:
      obtain first image data from a first sensor coupled to the first housing portion of the housing;
      obtain second image data from a second sensor coupled to the second housing portion of the housing;
      determine an angle between the first housing portion and the second housing portion;
      determine one or more extrinsic parameters based on the determined angle, the one or more extrinsic parameters comprising at least one of a first translation matrix associated with the first sensor or a second translation matrix associated with the second sensor;
      align the first image data with the second image data based on translation of a reference of the first sensor to a corresponding reference of the second sensor based on at least one of the first translation matrix or the second translation matrix;
      determine a depth of an object based on the aligned first image data and second image data;
      output an adjusted angle between the first housing portion and the second housing portion based on the depth; and
      perform an image capture operation based on the adjusted angle.

2. The image capture device of claim 1, wherein the at least one processor is further configured to execute the instructions to:
   based on the output of the adjusted angle, obtain third image data from the first sensor and fourth image data from the second sensor; and
   generate a multi-view image based on the third image data and the fourth image data.

3. The image capture device of claim 2, wherein the at least one processor is further configured to execute the instructions to:
   generate a user-composed image based on an application of a photoeffect to the multi-view image; and
   store the user-composed image in the non-transitory, machine-readable storage medium.

4. The image capture device of claim 3, the at least one processor is further configured to execute the instructions to:
   segment the multi-view image; and
   apply the photoeffect based on the segmented multi-view image.

5. The image capture device of claim 4, wherein the photoeffect comprises a Bokeh effect.

6. The image capture device of claim 1, wherein:
   the object comprises a face; and
   the at least one processor is further configured to execute the instructions to detect the face.

7. The image capture device of claim 1, wherein the at least one processor is further configured to execute the instructions to:
   determine the depth of the object further based on the determined angle.

8. The image capture device of claim 1, wherein the at least one processor is further configured to execute the instructions to generate disparity data based on the first image data and the second image data.

9. The image capture device of claim 8, wherein the at least one processor is further configured to execute the instructions to:
   determine a baseline length between the first sensor and the second sensor based on the determined angle;
   determine a focal length of at least one of the first sensor or the second sensor; and
   generate depth values based on the disparity data, the baseline length, and the focal length.

10. The image capture device of claim 8, wherein the at least one processor is further configured to execute the instructions to:
    determine a disparity of the object based on the disparity data; and
    output the adjusted angle based on the disparity and a disparity threshold.

11. The image capture device of claim 1, wherein the at least one processor is further configured to execute the instructions to:
    obtain position data from a position sensor;
    determine the angle between the first housing portion and the second housing portion based on the position data; and
    determine the adjusted angle further based on the determined angle.

12. The image capture device of claim 1, wherein:
    the first housing portion comprises a first portion of a display;
    the second housing portion comprises a second portion of the display; and
    the first sensor is disposed underneath the first portion of the display, and the second sensor is disposed underneath the second portion of the display.

13. The image capture device of claim 1, further comprising a motor.

14. The image capture device of claim 13, wherein the motor is configured to adjust the angle between the first housing portion and the second housing portion based on the adjusted angle.

15. The image capture device of claim 1, wherein the at least one processor is further configured to execute the instructions to output a GUI element on a display based on the adjusted angle.

16. A method for operating an image capture device, comprising:
    obtaining first image data from a first sensor coupled to a first housing portion of a housing of the image capture device;
    obtaining second image data from a second sensor coupled to a second housing portion of the housing;
    determining an angle between the first housing portion and the second housing portion;
    determining one or more extrinsic parameters based on the determined angle, the one or more extrinsic parameters comprising at least one of a first translation matrix associated with the first sensor or a second translation matrix associated with the second sensor;
    aligning the first image data with the second image data based on translation of a reference of the first sensor to a corresponding reference of the second sensor based on at least one of the first translation matrix or the second translation matrix;
    determining a depth of an object based on the aligned first image data and second image data;

outputting an adjusted angle between the first housing portion and the second housing portion based on the determined depth; and performing an image capture operation based on the adjusted angle.

17. The method of claim 16, wherein performing the image capture operation comprises:

based on the output of the adjusted angle, obtaining third image data from the first sensor and fourth image data from the second sensor; and generating a multi-view image based on the third image data and the fourth image data.

18. The method of claim 17, further comprising:

generating a user-composed image based on an application of a photoeffect to the multi-view image; and storing the user-composed image in a memory device.

19. The method of claim 18, wherein generating the user-composed image comprises:

segmenting the multi-view image; and applying the photoeffect based on the segmentation.

20. The method of claim 19, wherein the photoeffect comprises a Bokeh effect.

21. The method of claim 16, wherein the object comprises a face, and wherein the method further comprising detecting the face.

22. The method of claim 16, further comprising:

determining the depth of the object further based on the determined angle.

23. The method of claim 16, wherein determining the depth of the object comprises generating disparity data based on the first image data and the second image data.

24. The method of claim 23, wherein determining the depth of the object comprises:

determining a baseline length between the first sensor and the second sensor based on the determined angle;

determining a focal length of at least one of the first sensor or the second sensor; and generating depth values based on the disparity data, the baseline length, and the focal length.

25. The method of claim 23, further comprising:

determining a disparity of the object based on the disparity data; and outputting the adjusted angle based on the disparity and a disparity threshold.

26. The method of claim 16, further comprising:

obtaining position data from a position sensor;

determining the angle between the first housing portion and the second housing portion based on the position data; and determining the adjusted angle further based on the determined angle.

27. The method of claim 16, wherein:

the first housing portion comprises a first portion of a display;

the second housing portion comprises a second portion of the display; and the first sensor is disposed underneath the first portion of the display, and the second sensor is disposed underneath the second portion of the display.

28. The method of claim 16, further comprising adjusting the angle between the first housing portion and the second housing portion based on the adjusted angle using a motor.

29. The method of claim 28, further comprising displaying a GUI element based on the adjusted angle.

* * * * *